T. J. FAY & J. M. ELLSWORTH.
SPRING SUPPORT.
APPLICATION FILED DEC. 5, 1906.
901,162.
Patented Oct. 13, 1908.
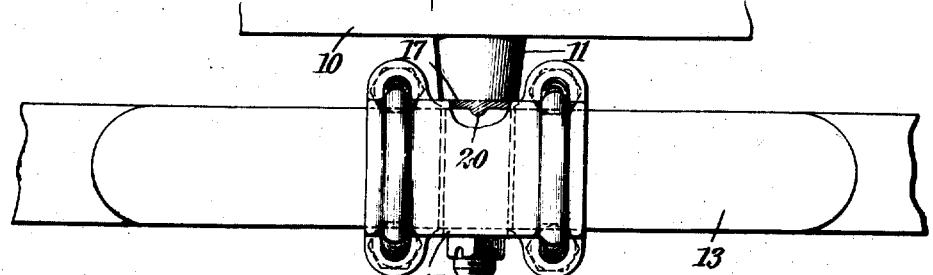
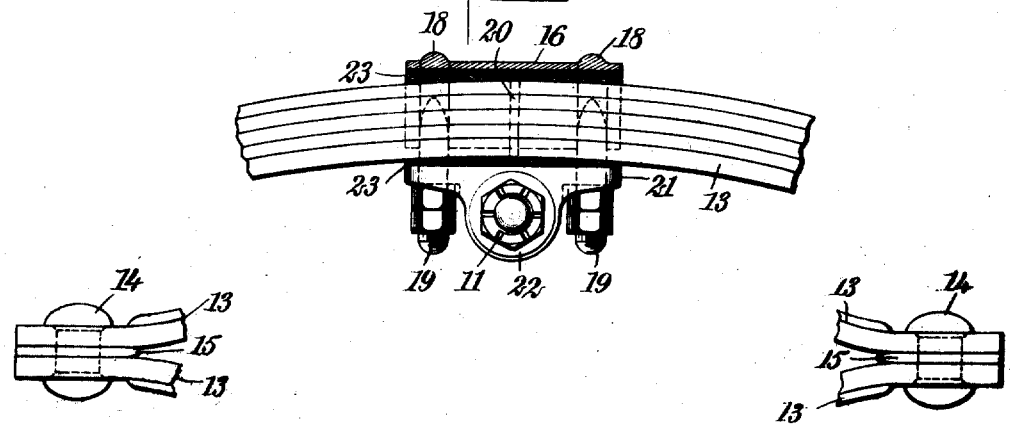
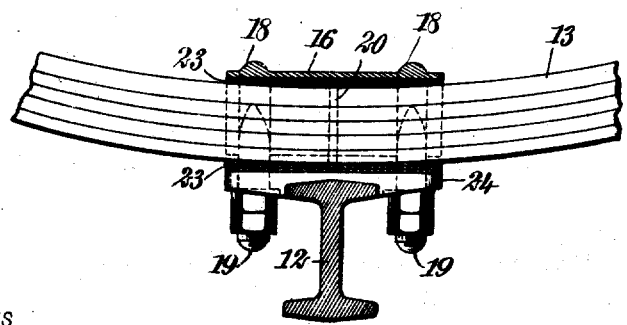
WITNESSES
INVENTORS
Thomas J. Fay
John Magee Ellsworth
BY Munn & Co
ATTORNEYS

UNITED STATES PATENT OFFICE.

THOMAS J. FAY, OF NEW YORK, N. Y., AND JOHN MAGEE ELLSWORTH, OF BERNARDSVILLE, NEW JERSEY.

SPRING-SUPPORT.

No. 901,162.

Specification of Letters Patent.

Patented Oct. 13, 1908.

Application filed December 5, 1906. Serial No. 346,415.

*To all whom it may concern:*

Be it known that we, THOMAS J. FAY, a resident of the city of New York, (borough of Brooklyn), in the county of Kings, State of New York, and JOHN MAGEE ELLSWORTH, a resident of Bernardsville, in the county of Somerset, State of New Jersey, both citizens of the United States, have invented a new and Improved Spring-Support, of which the following is a full, clear, and exact description.

This invention relates to certain improvements in spring supports for use in connection with motor vehicles, and relates more particularly to the specific means for securing the spring to the body or chassis.

The object of the invention is to provide an improved securing means or clip in which the securing bolts are formed integral with the main body of the clip, whereby the breaking of a bolt will not loosen the spring, and wherein the spring will be firmly held at all times unless all of the bolts should become broken.

A further object of the invention is to provide means whereby the springs may be firmly held against longitudinal movement, but wherein the springs are not materially weakened by such holding means.

Further objects and advantages of our improved device will be hereinafter pointed out and the specific structure defined in the claims.

Reference is to be had to the accompanying drawings forming a part of this specification, in which similar characters of reference indicate corresponding parts in both the figures, in which Figure 1 is a plan view of our improved spring holder, a portion thereof being broken away; and Fig. 2 is a longitudinal section through the spring support, also showing our improved means for securing together the ends of the springs.

In the drawings there is illustrated a small portion of the chassis 10 having a spindle or stud 11 carried thereby and adapted to have one member of the elliptical spring secured thereto, while there is also shown a portion of the axle 12 to which the opposite member of the spring is fastened. The spring 13 is of elliptical form and made up of a plurality of laminæ of different lengths, the inner laminæ being the longest, and rigidly secured together by means of bolts or rivets 14, as indicated in Fig. 2. Intermediate these laminæ is preferably provided a packing 15 of leather or other suitable material.

The supports or the upper and lower members of the elliptical spring are similar and each comprises a U-shaped member having a top plate 16 of a width slightly greater than the width of the spring, and having side plates 17 integral therewith and spaced apart a distance substantially equal to the width of the spring. These side plates and the top plate are formed integral, and adjacent each end of the top and side plates is provided a reinforcing flange 18, which at points adjacent the lower edges of the side plates terminates in bolts 19. The bolts, reinforcing flanges, side plates and top plate comprise a single piece of metal, and are adapted to fit down over the spring and engage with the top and sides thereof. The side plates 17 are of a width slightly less than the depth of the spring member, as indicated in Fig. 2, whereby the lower edges of said plates cannot contact with the second member of the support and interfere in any way with the tightening of the bolts.

In order to prevent longitudinal movement of the springs, we provide either one or both of the side plates 17 with a vertical flange or projection 20 upon its inner side, and this flange or projection fits into a corresponding depression or groove cut in the side of the spring member. The flange and groove are preferably rounded, whereby no sharp line or edge is produced and the tendency to break at this point is thus reduced to a minimum. The flange does not extend into the spring member a sufficient distance to materially reduce the width of said spring member, but only to a distance sufficient to prevent the longitudinal movement of the spring.

In connection with the upper support, we provide a plate 21 of a length substantially equal to the top and side plates above described, and of a width substantially greater than the top plate. This bottom plate 21 is provided with bolt holes adjacent its four corners adapted to receive the bolts 19, and is also provided with a bearing 22 extending substantially parallel to the axle of the vehicle and adapted to receive the spindle or stud 11 carried by the chassis. Intermediate the plate 21 and the spring member, and also intermediate the top plate 16 and the upper side of the spring member, are preferably provided packings 23 of leather or other suitable material, serving to prevent rattling should the parts become slightly loosened, and also facilitating the firm holding of the spring by the spring support. In connection with the supporting member at the lower side of the spring, we provide a plate 24, substantially similar to the plate 21 but adapted to be secured to the axle 12 in any suitable manner.

By means of the improved construction above described, should one of the bolts become broken or the nuts thereon become loosened, the spring member will still be held firmly within its support, inasmuch as the bolts are all integral with the side and top plates, and the loosening of one bolt does not permit the supporting members to become loosened. In fact, if all of the bolts but one should become broken or the nuts thereof lost off, the parts would still be held in engagement by means of the single remaining bolt. It is customary to secure the springs within the supports and prevent longitudinal movement thereof by means of a bolt extending through an opening in the spring intermediate the ends thereof. This materially weakens the spring and it soon becomes broken at this point, but by means of our improved construction the spring is firmly held within the support, and is, furthermore, positively prevented from any longitudinal movement in respect to said support.

Having thus described our invention, we claim as new and desire to secure by Letters Patent:

1. A support for a spring, comprising a member having a top plate, side plates adapted to engage with the sides of a spring and a reinforcing flange extending across the side and top plates, each end of said flange terminating in a bolt extending beyond the edge of the respective side plates, one of said plates having an inwardly directed flange for engagement in a corresponding recess in the spring to hold said spring against longitudinal movement, and means adapted to be rigidly secured to said bolts to hold the spring in engagement with said member.

2. A support for springs, comprising a member having a top plate, parallel side plates adapted to engage with the sides of the spring, and reinforcing flanges extending across the side and top plates adjacent each end thereof, each end of each flange terminating in a bolt extending beyond the edge of the respective side plates, said top and side plates, reinforcing flanges and bolts being formed of a single piece of metal, and means adapted to be rigidly secured to said bolts to hold the spring in engagement with said member.

3. A support for springs, comprising a member having a top plate, parallel side plates integral therewith and adapted to engage with the sides of the spring, reinforcing flanges extending across the side and top plates adjacent each end thereof, a curved flange upon the inner side of one of said plates and adapted to enter a corresponding groove in the spring to prevent longitudinal movement of the latter, and means for holding the spring between said side plates.

4. A support for springs, comprising a member having a top plate, parallel side plates adapted to engage with the sides of the spring, and reinforcing flanges extending across the side and top plates adjacent each end thereof, each end of each flange terminating in a bolt extending at right angles to the top plates and beyond the edge of the respective side plates, one of said side plates being provided with a flange on its inner side adapted to engage with a corresponding groove in the spring to prevent longitudinal movement of the latter.

5. In combination, an elliptical spring having the ends thereof rigidly secured together, supports for said spring intermediate the ends thereof, each of said supports comprising a top plate, parallel side plates adapted to engage with the sides of the spring, one of said side plates being provided with a flange and the spring being provided with a corresponding groove, whereby longitudinal movement of the spring is prevented, and reinforcing flanges extending across each end of the top plate and side plates and terminating in bolts, said bolts, flanges, side plates and top plate being formed of a single piece of metal.

6. In combination, an elliptical spring having the ends thereof rigidly secured together, means for securing one spring member to the axle of a vehicle, means for securing the other spring member to the body of the vehicle, said last mentioned means comprising a top plate, side plates adapted to engage with the sides of the spring, reinforcing flanges extending across each end of the top plate and side plates and terminating in bolts extending beyond the spring, said bolts, flanges and plates being formed of a single piece of metal, a plate adapted to be pivotally secured to the vehicle body and having means for securing said plate to each of said bolts, and packings intermediate the top plate and the spring and between the last mentioned plate and the spring.

In testimony whereof we have signed our names to this specification in the presence of two subscribing witnesses.

THOMAS J. FAY.
JOHN MAGEE ELLSWORTH.

Witnesses:
 JNO. M. RITTER,
 CLAIR W. FAIRBANK.